(12) United States Patent
Rasin et al.

(10) Patent No.: US 8,073,589 B2
(45) Date of Patent: Dec. 6, 2011

(54) USER INTERFACE SYSTEM FOR A VEHICLE

(75) Inventors: Vladimir Rasin, Teddington (GB); Mark Schunder, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1376 days.

(21) Appl. No.: 11/565,876

(22) Filed: Dec. 1, 2006

(65) Prior Publication Data
US 2008/0133082 A1 Jun. 5, 2008

(51) Int. Cl.
*G06F 7/00* (2006.01)
(52) U.S. Cl. ......................... 701/36; 455/3.06
(58) Field of Classification Search ............ 701/36, 701/2, 29, 33, 35; 370/313, 401; 455/3.06; 725/37, 52, 74–77, 80
See application file for complete search history.

(56) References Cited

U.S. PATENT DOCUMENTS

| | | | | |
|---|---|---|---|---|
| 6,427,115 B1 * | 7/2002 | Sekiyama | ..................... | 701/208 |
| 7,155,321 B2 * | 12/2006 | Bromley et al. | ................ | 701/29 |
| 7,191,040 B2 * | 3/2007 | Pajakowski et al. | .............. | 701/1 |
| 7,289,020 B2 * | 10/2007 | Larson et al. | .................. | 340/438 |
| 2003/0139179 A1 * | 7/2003 | Fuchs et al. | .................... | 455/426 |
| 2004/0198466 A1 * | 10/2004 | Walby et al. | .................. | 455/574 |
| 2005/0021190 A1 * | 1/2005 | Worrell et al. | ..................... | 701/1 |

OTHER PUBLICATIONS

Vladimir Rasin, "An In-Vehicle Human-Machine Interface Module", XML Journal, Sep. 7, 2006, http://xml.sys-con.com/read/40547.htm, 9 pages.

* cited by examiner

*Primary Examiner* — Dalena Tran
(74) *Attorney, Agent, or Firm* — Jennifer M. Stec; Brooks Kushman P.C.

(57) ABSTRACT

A user interface system and method for a vehicle enables access to an electronic device. The electronic device is configured to transmit a first data set wherein the first data set indicates at least one of appearance and a function requirement. A user interface module is included having a second data set and a display unit configured to electronically display information that is assessable via the electronic device. Additionally, a conversion engine communicates with the user interface module and the electronic device and processes the first data set and the second data set. Based on the first and second data set, a third data set is generated that is loaded into the user interface module. Through the use of the third data set, the user information system provides access to the electronic device.

20 Claims, 2 Drawing Sheets

USER INTERFACE SYSTEM FOR A VEHICLE

TECHNICAL FIELD

The present invention relates generally to a user interface system for a vehicle that enables access to an electronic device.

BACKGROUND

The use of electronic devices in vehicles is common. Particularly, it is well known that consumers utilize devices such as phones, PDAs, and computers to access information. To facilitate the use of these devices, the vehicle typically includes a user interface that enables the user to access the electronic device and utilize services and/or applications located thereon. Conventionally, the vehicle user interface is specifically programmed to operate with a particular electronic device so as to utilize the device's applications and/or services. However, to enable the user interface to operate with other types of electronic devices, it is required that the user interface be reprogrammed to operate with these additional devices. Such reprogramming typically requires manual programming by a authorized dealership or designer. Accordingly, the conventional user interface systems are incapable of dynamically adjusting or programming itself to operate with multiple types of electronic devices.

The present invention was conceived in view of these and other disadvantages of conventional user interface systems.

SUMMARY

The present invention discloses a user interface system and method for a vehicle that enables access to an electronic device. In one embodiment, the electronic device is configured to transmit a first data set wherein the first data set indicates at least one of appearance and a function requirement. The system includes a user interface module having a second data set and a display unit configured to electronically display information that is assessable via the electronic device. In one aspect of the invention, a conversion engine is included that is configured to communicate with the user interface module and the electronic device. The conversion engine processes the first data set and the second data set and generates a third data set based on the first and second data set. Accordingly, the conversion engine enables access to the electronic device and causes the display unit to display the information in accordance with at least one of the appearance and the function requirement.

The method includes receiving, at a conversion engine that is operable with the user interface system, a first data set. An electronic device may generate or contain the first data set, which indicates at least one of an appearance and a function requirement. The method also includes receiving, at the conversion engine, a second data set wherein the second data set is generated or contained by the user interface system. The method further includes generating a third data set based on the first and second data sets through the use of the conversion engine. The method also includes loading the third data set into the user interface module, wherein the third set data enables access to the at least one application and causes the display unit to display the information in accordance with at least one of the appearance and the function requirement.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood with reference to the following description, taken in connection with the accompanying drawings in which:

DETAILED DESCRIPTION OF THE EMBODIMENTS

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular proponents. Therefore, specific functional details disclosed herein are not to be interpreted as limiting, but merely as a representative basis for the claims and/or as a representative basis for teaching one skilled in the art to variously employ in the present invention.

Figure 1:
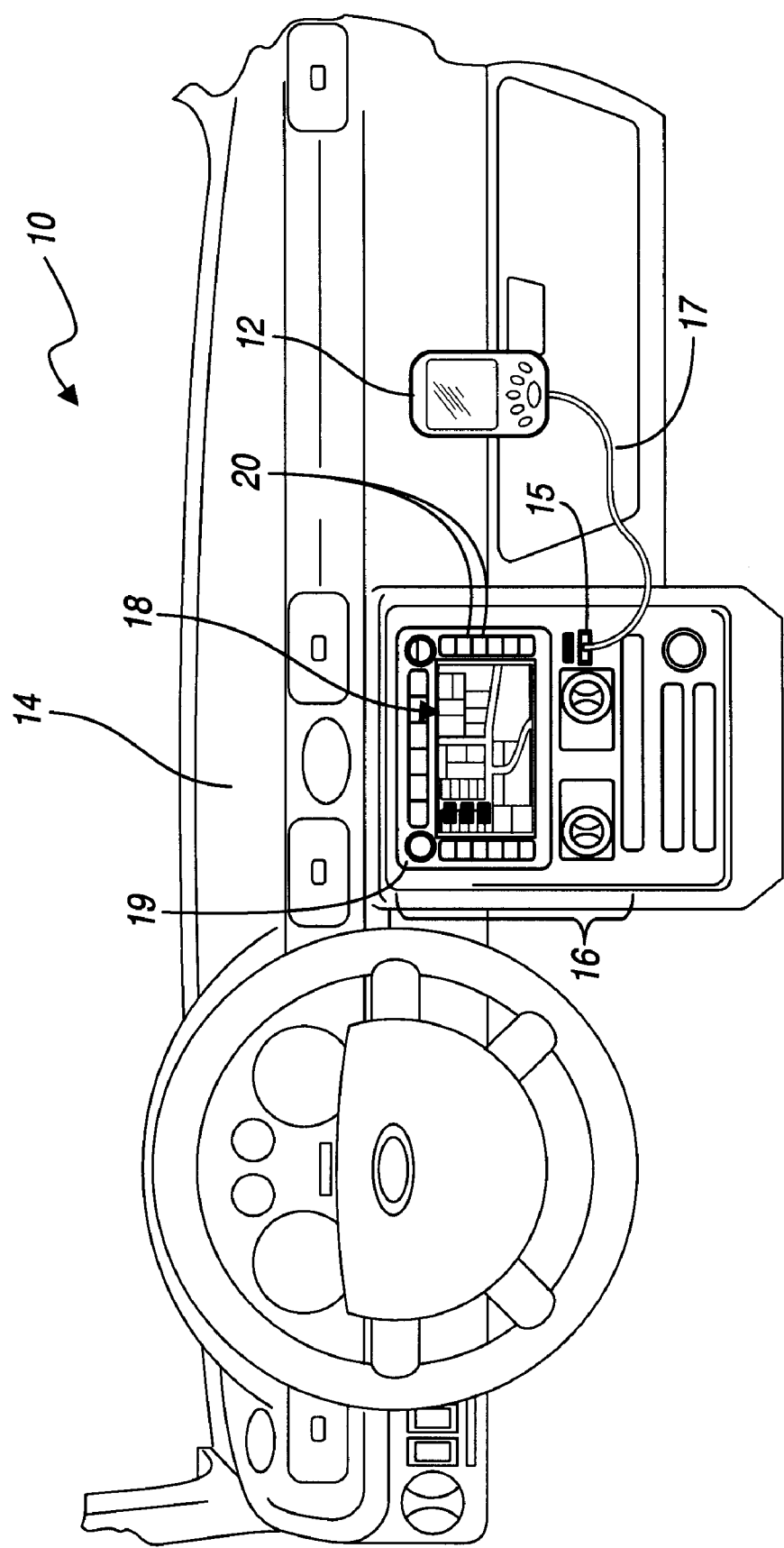
FIG. 1 illustrates a vehicle having a user interface system that enables access to a plurality of electronic devices in accordance with an embodiment of the present invention.

Referring to FIG. 1, a vehicle 10 is illustrated that is configured to communicate and enable access to electronic devices including services and/or applications available via the electronic devices. In one aspect of the present invention, the electronic devices may be virtually any external device including, but not limited to, a personal digital assistant (PDA), a handheld computer, and the like. As shown, vehicle 10 includes an instrument panel 14 having a user interface system 16. The user interface system 16, which may be referred to as an in-vehicle human machine interface (HMI), provides vehicle occupants information/data pertaining to vehicle 10, its systems, and devices, including an electronic device 12. As such, user interface system 16 has a display unit 18, a user interface module 19 and multiple selection devices 20.

Display unit 18 is adapted to display information such as maps generated by a navigation system, audio system information, climate information, and services/applications that are accessible through the use of electronic device 12. Selection devices 20 may be buttons or keys that are designated to effect certain functions by user interface system 16 and electronic device 12. It is recognized that in alternative embodiments selection devices 20 may not be included. In either embodiment the user interface system may generate "soft buttons" that appear via display unit 18. Accordingly, the user may touch or contact the area of the display having the soft button to effect certain functions by user interface system 16 and electronic device 12.

User interface system 16 also includes a user interface module 19 having a controller that is capable of processing and storing data in memory. The controller of user interface module 19 may have stored therein a data set, which may describe default functions and capabilities of user interface system 16 including display unit 18, user interface module 19, and selection devices 20.

In the embodiments described herein, the term data set refers to any logical grouping or collection of related data.

Additionally, the data sets described herein may be formatted in accordance with a vehicle user interface markup language (VUML) specification. The specification is a data specification that may be based on an extended markup language (XML). The VUML specification may also function as a human machine interface (HMI)specification for HMI systems/devices such as user interface system 16. Accordingly, the VUML provides a convenient mechanism for communicating with devices such as electronic device 12. As such, the user interface system 16 is programmed to receive and process data in the VUML format.

The VUML specification may also describe both appearance and functional requirements of the user interface system 16 and the electronic device 12. The appearance requirements include requirements that services available via electronic device 12 dictate in a physical and functional manifestation. For instance, where electronic device 12 is a "moving picture expert group" (MPEG) layer 3 (MP3) player, it would have functions such as "stop," "next track," "previous track," "pause," and the like. The device 12 would also have specific buttons to invoke these functions. Accordingly, the appearance requirement, embodied as data in accordance with the VUML specification, would cause either soft or physical buttons on user interface system 16 to be arranged and programmed to allow seamless activation of the these functions.

The functional requirements include any data required by user interface system 16 to enable access to services available via electronic device 12. For example, if the data set of device 12 includes song lists, the functional requirement for the user interface system 16 would be data that enables the song lists to be displayed by user interface system 16.

Regarding the user interface system 16, the stored data set may include, but is not limited to, data that describes the standard functions of vehicle accessories or systems. For example, the data set may describe vehicle climate control system functions, radio functions, compact disc player functions, and the like. Additionally, the data set within the controller of user interface module 19 may describe the functions of a vehicle MP3 player. Because the data set of user interface module 19 describes standard vehicle system functions, the specific data set stored within user interface module 19 may be defined by the manufacturer of user interface system 16 or vehicle 10.

As described in the foregoing, electronic device 12 may be a PDA, a handheld computer, a cellular telephone, a smart phone, a laptop and the like that is capable of providing services and applications for use by vehicle occupants. As such, electronic device 12 may have an available and unavailable mode. In the available mode, the electronic device 12 is connected to user interface system 16. In the unavailable mode, electronic device 12 is either disconnected or not available to be synchronized with user interface system 16.

Electronic device 12 may also have a data set stored in memory that describes services and/or applications available via device 12. The data set of device 12 also describes how the display 18 should appear and function to utilize the services and/or applications available via device 12. For example, in the case where electronic device 12 is a PDA or hand-held computer, the data would describe the use of the device's personal calendar function and/or a MP3 function. Additionally, the data set of electronic device 12 includes data that describes how the user interface for electronic device 12 should be presented to a vehicle occupant.

Nevertheless, as shown, electronic device 12 may be connected to user interface system 16 through the use of a port 15. Although electronic device 12 is physically connected to user interface 16 through the use of a cable 17, it is recognized that communications may occur wirelessly. As such, it is contemplated by the present invention that electronic device 12 may communicate with user interface system 16 via a wireless protocol including, but not limited to bluetooth, wi-fi, and the like. Thus, via user interface system 16, a vehicle occupant may utilize services and applications of electronic device 12.

Furthermore, unlike conventional systems, user interface system 16 is capable of operating with a plurality of electronic devices. Particularly, user interface system 16 may automatically reprogram itself, in accordance with predetermined user guidelines to enable access to virtually any type of electronic device.

Figure 2:
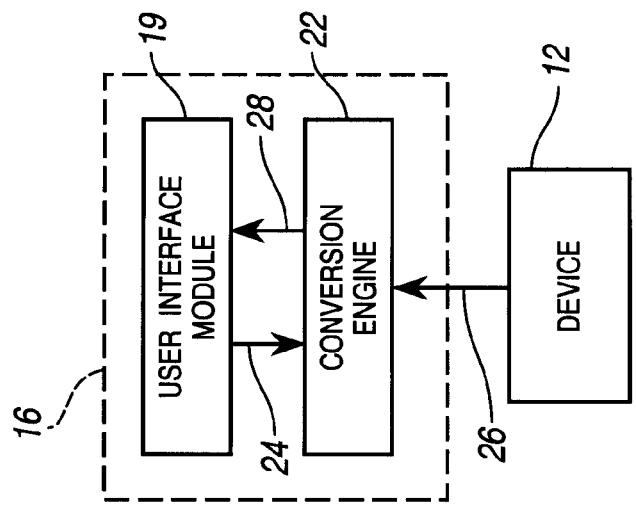
FIG. 2 illustrates communications between the user interface system and an exemplary electronic device in accordance with an embodiment of the present invention.

Now, referring to FIG. 2, a block diagram is shown wherein user interface system 16 communicates with device 12 through the use of a conversion engine 22. As described above, user interface system 16 is capable of operating with multiple types of devices through dynamic reprogramming. The dynamic reprogramming occurs through processing of data sets from electronic device 12 and user interface module 19.

As described above, user interface system 16 includes conversion engine 22 and user interface module 19. In some embodiments, conversion engine 22 may be integrated with the user interface module 19. Alternatively, conversion engine 22 may be discretely packaged in a separate module without departing from the scope of the present invention. Conversion engine 22 may be a memory storage and data processing device having conversion data that is adapted to process the data sets transmitted by user interface module 19 and device 12. The conversion data includes a set of conversion rules by which the data sets are processed. These conversion rules correspond to the appearance requirement and functional requirement by controlling the appearance of information displayed by display unit 18 and the function of selection devices 20. Accordingly, the conversion rules map certain functions available through the device 12 with user interface system 16. It is recognized that the user interface and corresponding data sets of device 12 are generic in that it is not programmed or keyed to a particular vehicle. Therefore, the data set in its native form cannot be loaded by user interface system 16. Accordingly, the conversion rules would enable the conversion of the data set to control the mapping of buttons/knobs located on user interface system 16 to function of device 12. For example, a conversion rule may require mapping of a specific button on user interface module 16 to a "play" function of device 12.

Accordingly, conversion engine 22 receives data sets from user interface module 19 and electronic device 12 as indicated by user interface data set signal 24 and device data set 26. As stated above, the data set transmitted by electronic device 12 indicates requirements for the appearance of applications located on device 12 as displayed by display unit 18. The data set transmitted by user interface module 19 also indicates the functional requirements for selection devices 20 while electronic device 12 is connected to user interface system 16.

Upon receipt of data sets from user interface module 19 and electronic device 12, conversion engine 22 generates a converted data set signal 28. The converted data set is generated based on the data sets transmitted by user interface module 19 and electronic device 12. Based on the requirements contained by the data sets from user interface module 19 and device 12 in addition to the conversion data rules, the converted data set enables user interface system 16 to dynamically adjust its data processing and communicate with electronic device 12. Accordingly, the converted data set signal 28 causes the user interface module 19 to function in accordance with the appearance and functional requirements of user interface module 19 and electronic device 12. The converted data set is then loaded into the user interface module in a known manner so as to enable a user of user interface system 16 to access services and/or applications provided by electronic device 12. As such, while electronic device 12 is connected to user interface system 16 (i.e., in the available mode), the user interface system 16 provides the user a transparent interface in which to utilize electronic device 12. In the event electronic device 12 enters the unavailable mode (e.g., becomes disconnected), the original or default data set transmitted by user interface module 19 may be restored to user interface module 19 so as to enable user interface system 16 to operate as originally programmed.

Figure 3:
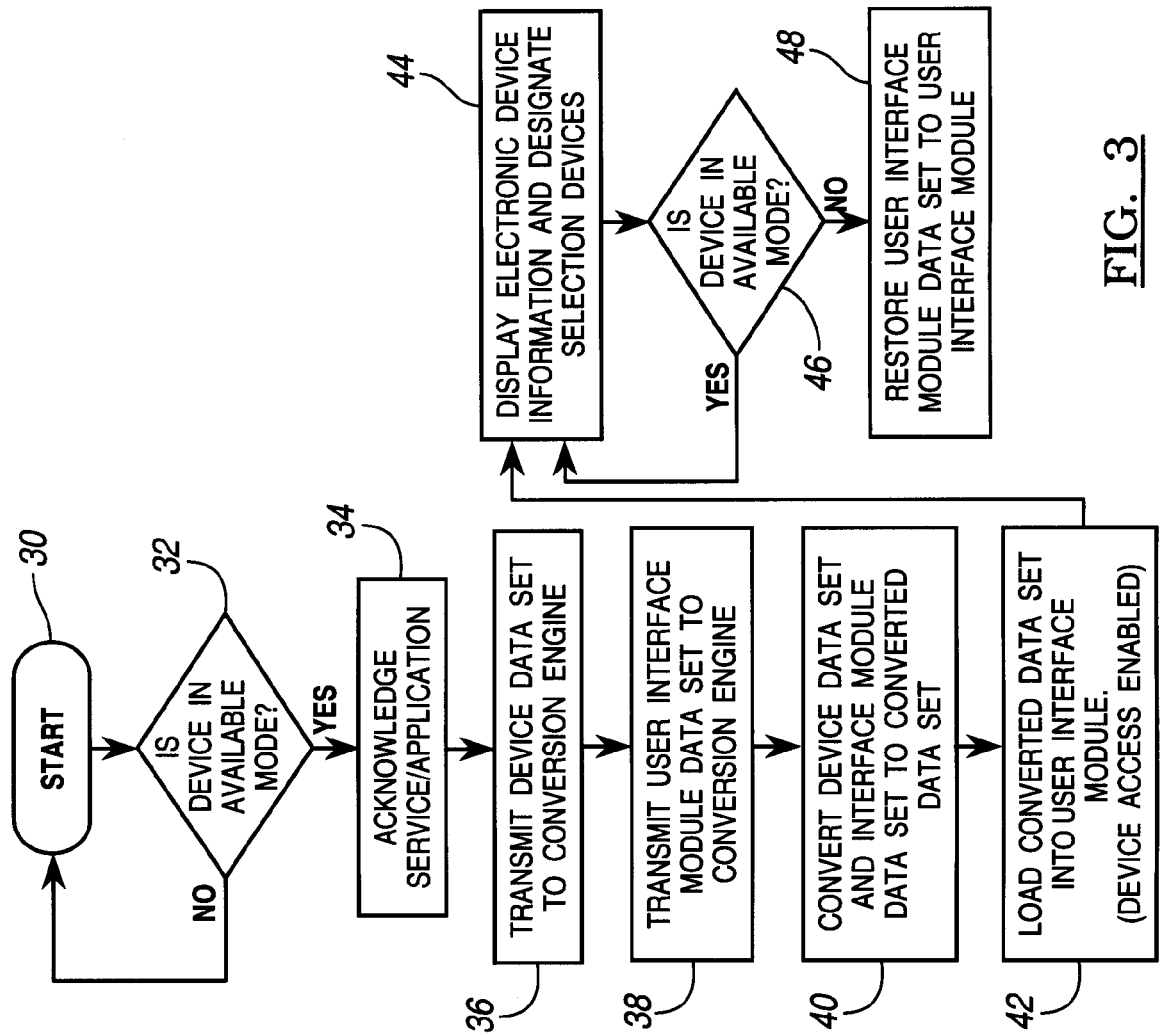
FIG. 3 illustrates a flow chart of a method for enabling access to electronic devices through the use of a user interface system in accordance with an embodiment of the present invention.

FIG. 3 illustrates a flow chart of a method for accessing an electronic device including services and/or applications located thereon. Block 30 is an entry point into the method. Block 32 determines whether the device is in the available mode. If the device is not in the available mode, the method returns to block 30. If the device is determined to be in the available mode, block 34 occurs, wherein the user interface module acknowledges the electronic device including services and/or applications located thereon. Following this acknowledgment, the electronic device transmits a data set to the conversion engine as depicted by block 36. As shown by block 38, the user interface module transmits a data set to the conversion engine. It is recognized that blocks 36 and 38 may also occur simultaneously or in reverse order without departing from the scope of the invention.

As depicted by block 40, upon receipt of the data sets from the electronic device and the user interface module, the conversion engine converts the data sets into a converted data set. Accordingly, the converted data set is loaded into the user interface module. Once the converted data set is loaded, access to the electronic device is enabled. Block 44 illustrates a step wherein the user interface system provides/displays electronic device services and/or applications. At block 44, selection device functions are designated. Accordingly, at block 44, the user may utilize the applications and services of the electronic device 12. At block 46, the method determines whether the electronic device is maintained in the available mode. If the device is in the available mode, the method returns to block 44. If the electronic device is not in the available mode, block 48 occurs. At block 48, the user interface module data set (also referred to as default data set) is restored to the user interface module.

While the best mode for carrying out the invention has been described in detail, those familiar with the art to which this invention relates will recognize various alternative designs and embodiments for practicing the invention as defined by the following claims.

What is claimed:

1. A user interface system for a vehicle that enables access to a portable electronic device, the electronic device being configured to transmit a first data set, wherein the first set indicates at least one of an appearance and a function requirement, the system comprising:
    a vehicle-mounted user interface module having a second data set and a display unit configured to electronically display information that is accessible via the portable electronic device; and
    a conversion engine configured to communicate with the user interface module and the electronic device, the conversion engine processing the first data set and the second data set and generating a third data set based on the first data set and the second data set thereby enabling access to the electronic device and causing the display unit to display the information in accordance with at least one of the appearance and the function requirement.

2. The user interface system of claim 1, wherein the user interface module includes at least one selection device, the conversion engine processing the first data set and the second data set to cause the selection device to operate and effect user interface module functions in accordance with at least one of the appearance and the function requirement.

3. The user interface system of claim 1, wherein the third data set is loaded into the user interface module thereby enabling access to the electronic device and causing the display unit to display the information in accordance with at least one of the appearance and the function requirement.

4. The user interface system of claim 3, wherein the conversion engine has conversion data adapted to process the first and second data set to generate the third data set.

5. The user interface system of claim 4, wherein the conversion data provides data conversion rules by which the first and second data set are processed to generate the third data set.

6. The user interface of claim 1, wherein the conversion engine is integrated with the user interface module.

7. The user interface of claim 1, wherein the first, second, and third data sets are compatible with a vehicle user interface markup language (VUML) specification.

8. A user interface system for a vehicle that enables access to at least one application on a portable electronic device, the electronic device having an available mode and unavailable mode and being configured to transmit a first data set, wherein the first data set indicates at least one of an appearance and a function requirement, the system comprising:
    a vehicle-mounted user interface module having a second data set and a display unit configured to display information pertaining to the application; and
    a conversion engine being operable with the user interface module and configured to communicate with the portable electronic device so long as the electronic device is in the available mode, the conversion engine processing the first data set and the second data set and generating a third data set based on the first and second data sets, thereby enabling access to the at least one application and causing the display unit to display the information in accordance with at least one of the appearance and the function requirement.

9. The user interface system of claim 8, wherein the user interface module includes at least one selection device, the conversion engine processing the first data set and the second data set to cause the selection device to operate and effect user interface module functions in accordance with the function requirement.

10. The user interface system of claim 8, wherein the third data set is automatically loaded into the user interface module thereby enabling access to the electronic device and causing the display unit to display the information in accordance with at least one of the appearance and the function requirement.

11. The user interface system of claim 10, wherein the second data set is restored to the user interface module when the electronic device is in an unavailable mode.

12. The user interface system of claim 8, wherein the conversion engine has conversion data adapted to process the first and second data set to generate the third data set.

13. The user interface system of claim 12, wherein the conversion data provides data conversion rules by which the first and second data set are processed to generate the third data set.

14. The user interface of claim 8, wherein the conversion engine is integrated with the user interface module.

15. The user interface of claim 8, wherein the first, second, and third data sets are compatible with a vehicle user interface markup language (VUML) specification.

16. A method of accessing an electronic application on a portable electronic device through the use of a user interface system on a vehicle, wherein the user interface system includes a display unit configured to display information pertaining to the application, the method comprising:
- receiving, at a conversion engine that is operable with the user interface system, a first data set, wherein the first data set is generated by the portable electronic device and the first data set indicates at least one of an appearance and a function requirement;
- receiving, at the conversion engine, a second data set, wherein the second data set is generated by a vehicle-mounted user interface module;
- generating a third data set based on the first and second data sets through the use of the conversion engine; and
- loading the third data set into the user interface module, wherein the third data set enables access to the at least one application and causes the display unit to display the information in accordance with at least one of the appearance and the function requirement.

17. The method of claim 16, wherein the user interface module includes at least one selection device and the conversion engine receives the first data set and the second data set so as to cause the selection device to operate and effect user interface module functions in accordance with the function requirement.

18. The method of claim 16, wherein the conversion engine has conversion data for processing the first and second data set to generate the third data set.

19. The method of claim 18, wherein the conversion data provides data conversion rules by which the first and second data set are processed to generate the third data set.

20. The method of claim 18, further comprising generating a signal that indicates an available mode of the electronic device.

* * * * *